(12) United States Patent
Ramesh

(10) Patent No.: US 6,519,300 B1
(45) Date of Patent: Feb. 11, 2003

(54) SYSTEM AND METHOD FOR AUTOMATIC FREQUENCY CORRECTION IN A PILOT SYMBOL ASSISTED DEMODULATOR

(75) Inventor: Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/190,469

(22) Filed: Nov. 12, 1998

(51) Int. Cl.$^7$ ................................................. H04L 27/06
(52) U.S. Cl. ........................ 375/344; 375/316; 375/326; 375/343; 375/344; 375/346
(58) Field of Search ................................. 375/316, 344, 375/343, 355, 340, 346, 326, 150, 267; 455/504

(56) References Cited

U.S. PATENT DOCUMENTS

| | | | |
|---|---|---|---|
| 5,093,848 A | 3/1992 | Raith | 375/344 |
| 5,228,062 A | 7/1993 | Bingham | 375/344 |
| 5,276,706 A | 1/1994 | Critchlow | 375/343 |
| 5,625,573 A | 4/1997 | Kim | 375/344 |
| 5,659,573 A | 8/1997 | Bruckert et al. | 375/142 |
| 5,732,113 A | 3/1998 | Schmidl et al. | 375/355 |
| 5,901,185 A * | 5/1999 | Hassan | 375/346 |
| 5,912,931 A * | 6/1999 | Matsumoto et al. | 375/340 |
| 5,982,763 A * | 11/1999 | Sato | 370/342 |
| 6,085,103 A * | 7/2000 | Ramesh et al. | 455/504 |

FOREIGN PATENT DOCUMENTS

| | | |
|---|---|---|
| EP | 0 605 955 | 11/1993 |
| WO | WO 98/36580 | 8/1998 |

OTHER PUBLICATIONS

Wen–Yi Kuo, "Designs for pilot–symbol assisted burst–mode communications with fading and frequency uncertainty", published in the *International Journal of Wireless Information Networks*, vol. 1, No. 4, pp. 239–251, published Oct. 1994.

Wen–Yi Kuo and Michael P. Fitz, "Frequency Offset Compensation of Pilot Symbol Assisted Modulation in Frequency Flat Fading," *IEEE Transactions on Communications*, vol. 45, No. 11, Nov. 1997, pp.1412–1416.

* cited by examiner

*Primary Examiner*—Shuwang Liu
(74) *Attorney, Agent, or Firm*—Coats & Bennett, P.L.L.C.

(57) ABSTRACT

A method for selecting a frequency offset for automatic frequency correction in a pilot symbol assisted demodulation system comprises the steps of receiving a signal comprising a plurality of symbols having discrete possible values, and pilot symbols at predetermined locations in the signal having a predetermined value. The method further includes selecting a set of postulates defining a range of frequency offsets, multiplying the pilot symbols and selected ones of the plurality of the symbols by a sinusoid of the postulates to compensate for the postulated error, and estimating the channel at the error-compensated pilot symbols. The estimated channel at the error-compensated pilot symbols is then interpolated and a metric is generated for the error-compensated pilot and the selected symbols using the symbols' discrete possible values and the interpolated estimated channel. The postulate with a minimum accumulated metric is used in demodulating the symbols.

29 Claims, 4 Drawing Sheets

SYSTEM AND METHOD FOR AUTOMATIC FREQUENCY CORRECTION IN A PILOT SYMBOL ASSISTED DEMODULATOR

FIELD OF THE INVENTION

This invention relates to the field of wireless communications, and, more specifically, to wireless receivers that use automatic frequency correction in demodulation.

BACKGROUND OF THE INVENTION

Signals in wireless communications systems between mobile stations and base stations are subject to various conditions that can degrade the signal. For example, a receiver usually receives a signal from multiple directions (e.g., directly from the transmitter, and/or reflected off of many different topographical and man-made objects). The various signals are potentially out of phase with each other and thereby cancel each other out to some degree, reducing signal strength (known in the art as "fading"). Such signal fading generally occurs spatially over the area of the system with specific areas potentially having significant fading, which can cause complete signal loss.

Further, signals are subject to the Doppler effect as mobile stations move about the wireless communications system. As is known in the art, whenever relative motion exists between the signal source/transmitter and signal receiver, there is a Doppler shift of the frequency components of the received signal. When a mobile station moves toward a base station, there is a positive Doppler shift (i.e., the frequency of the signal increases). When a mobile station moves away from a base station, there is a negative shift (i.e., the frequency of the signal decreases). The shift in frequency results in the maximum signal strength being at the shifted frequency rather than the assigned frequency, with the signal strength being significantly less at the assigned frequency (as perceived by the receiver). If the mobile station also happens to pass through an area in the system that is subject to fading, a significant loss in signal strength can result. The net result of these and other factors is that the transmitted signal is distorted by the time it reaches the receiver. In a mobile station, this can result in distortion objectional to the ear or even loss of the signal.

In order to account for this distortion, channel estimates are used to determine the amplitude and phase distortion at known pilot symbols in the signal. Correction factors for the other symbols in the signal are interpolated from the channel estimates. As an example, signals are transmitted in the IS-136 system with 162 symbols, each symbol comprising two bits. In a proposed extension of the IS-136 system, the 162 symbols have at predetermined known locations $P_i$ in the signal predetermined, known pilot symbols $S_{pi}$ (where i=1 to n, n being the number of pilot symbols used).

Correction factors (i.e., channel estimates) interpolated from the channel estimates at the pilot symbols can be used to estimate the most likely value for each data symbol. That is, channel estimates derived from the pilot symbols are interpolated to determine the channel estimates for demodulating the other symbols. Such known interpolators try to fit a certain characteristic to the channel estimates obtained at the pilot symbols.

Typically, the interpolator uses knowledge of the statistical variations of the channel (fading) in time, and knowledge of the maximum Doppler frequency expected to be encountered, which depends on the maximum expected speed of the mobile station and the carrier frequency of operation.

Another problem that typically arises in wireless communications is one of frequency offset. This occurs because the frequency generated by the local frequency reference at the mobile station is different from that used by the base station in its transmission. Such frequency offset needs to be corrected to permit reliable demodulation of the data symbols.

In a communication system such as IS-136, automatic frequency correction can be handled in the process of demodulation, as described in U.S. Pat. No. 5,093,848 awarded to A. K. Raith of Ericsson. In this patent, an error signal from the demodulator is passed through a loop that produces at its output a smoothed estimate of the frequency offset. This frequency estimate is used to correct for the frequency error that is encountered.

In a system that employs pilot symbols and interpolation, the above method is not directly applicable, because the knowledge of the fading channel statistics and maximum Doppler frequency used by the interpolator are invalid in the presence of frequency offset. Thus, the interpolated channel estimates are erroneous, and this leads to degraded performance of the demodulator. In such systems, it is necessary to perform automatic frequency correction before interpolation can be done to produce interpolated channel estimates.

A method to perform the above has been disclosed in the paper "Frequency Offset Compensation of Pilot Symbol Assisted Modulation in Frequency Flat Fading" by Wen-Yi Kuo and Michael P. Fitz, which appears in the *IEEE Transactions on Communications*, Nov. 1997, pp. 1412–16, and is incorporated herein by reference. The method used in this paper finds channel estimates at the locations of the pilot symbols and tries to fit a sinusoid to these channel estimates, along with the knowledge that fading has occurred with a certain statistical variation. The method deduces the frequency offset from the best fit sinusoid. The main shortcoming of the above solution is that it takes a long time to converge.

The present invention is directed toward overcoming one or more of the problems set forth above.

SUMMARY OF THE INVENTION

According to one aspect of the present invention, a method is provided for selecting a frequency offset for automatic frequency correction in a pilot symbol assisted demodulator. The method comprises the steps of receiving a signal comprising a plurality of symbols having discrete possible values, and pilot symbols at predetermined locations in the signal, each pilot symbol having a predetermined value, selecting a set of postulates defining a range of frequency offsets, multiplying the pilot symbols and the selected ones of the plurality of the symbols by a sinusoid of each one of the set of postulates to compensate the waveforms for the postulated errors, and generating an estimated channel for each set of error-compensated pilot symbols. The estimated channel of each one of the set of error-compensated pilot symbols is then interpolated and metrics are generated for each one of the sets of error-compensated selected symbols using the symbols' discrete possible values and the interpolated estimated channel. The postulate with the minimum accumulated metric is used in demodulating the symbols.

According to a further aspect of the invention, the signal is time-aligned prior to selecting the postulates. According to another aspect of this invention, the postulates comprise $w_i$ and the step of multiplying the signal by a sinusoid of the postulate comprises multiplying the signal by $e^{-j2\pi w_i n}$. Further, the defined set of received symbols comprises $R_n$, the interpolate estimated channel comprises $C_n$ and the discrete possible data symbol values comprise $S_j$ wherein the step of generating the metric comprise finding a minimum for $|R_n - C_n * S_j|^2$.

In accordance with another aspect of this invention, the selected ones of the plurality of symbols comprises symbols at one or more vulnerable locations in the signal. A vulnerable location may be defined to be the mid-point between two pilot symbols. According to another aspect of this invention, coarse frequency correction of the signal is performed before the step of selecting postulates.

According to another aspect of this invention, an automatic frequency correction device is described in a pilot symbol assisted demodulator. The device receives a plurality of symbols, wherein ones of the symbols are predefined pilot symbols, and delivers a frequency offset for use in demodulation of the signal. The device includes an error compensator for multiplying the pilot symbols and selected ones of the symbols by sinusoid of each of a set of frequency offset postulates, a channel estimator configured to estimate a channel for each of the set of error-compensated pilot symbols, and an interpolator configured to interpolate the estimated channels. The automatic frequency correction device further includes a demodulator that generates a metric for each of the error-compensated symbols using the estimated channels and a selector for selecting one of the set of postulates with the minimum accumulated metric for use as a frequency offset in the automatic frequency compensation.

In accordance with a further aspect of this invention, the automatic frequency correction device further includes means for time aligning the symbols prior to error compensation. In accordance with a still further aspect of the invention, the automatic frequency correction device further includes means for coarse frequency correction of the symbols prior to error compensation. In accordance with a further aspect of this invention, a best postulate of the frequency offset is determined. After correction by this postulate, the demodulation is performed and the error signal in the demodulation process is passed through a frequency loop that produces, at its output, a smoothed estimate of the residual frequency offset that is not accounted for by the postulate produced earlier.

BRIEF DESCRIPTION OF THE DRAWINGS

A more complete understanding of this invention may be obtained from a consideration of the following detailed description in conjunction with the drawings, in which.

DETAILED DESCRIPTION

This invention is illustrated herein in the context of a mobile station operating in a wireless network. The applicability of this invention is not limited to mobile stations, however. This invention may be used in base stations or in most any application that uses automatic frequency correction.

Figure 1:
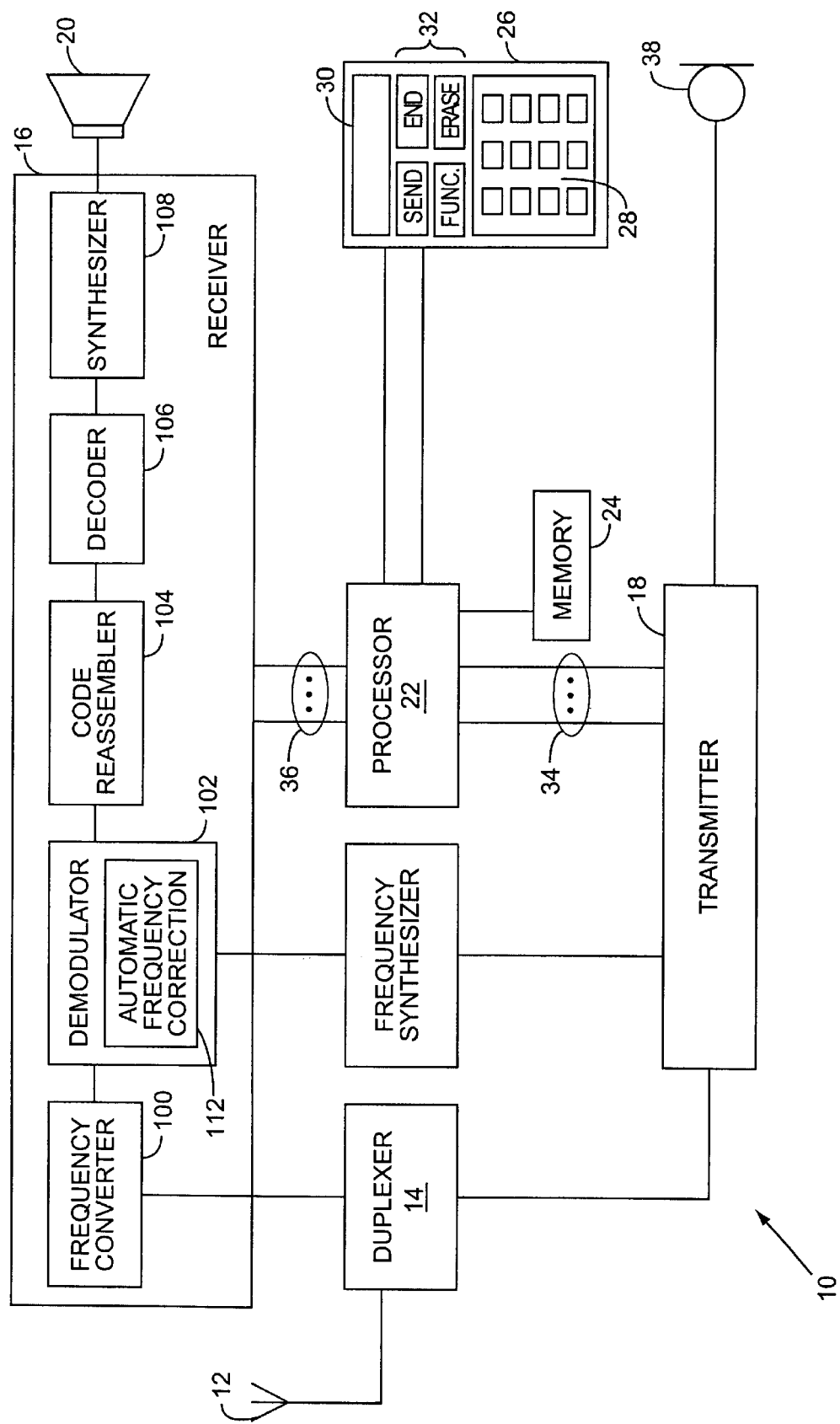
FIG. 1 is a block diagram of a mobile station in which this invention may be practiced.

FIG. 1 is a block diagram of a mobile station (also called a wireless telephone, cellular telephone or cell phone), shown generally at 10. Mobile station 10 includes an antenna 12 for sending and receiving radio signals between itself and a wireless network. Antenna 12 is connected to a duplexer 14 which enables receivers 16 and transmitter 18 to receive and broadcast (respectively) on the same antenna 12. Alternatively, a transmit/receive switch that alternates between different transmit and receive signal paths can be used, particularly when the transmit and receive times are non-overlapping. Receiver 16 demodulates, demultiplexes and decodes the radio signals into a control channel for control messages and a traffic channel for speech or data. Speech is delivered to speaker 20. Receiver 16 delivers messages from the control channel to processor 22.

Processor 22 controls and coordinates the functioning of mobile station 10 responsive to messages on the control channel using programs and data stored in memory 24. Processor 22 also controls the operation of mobile station 10 responsive to input from the user interface 26. The user interface 26 includes a keypad 28 as user input device and a display 30 to give the user information. Other devices are frequently included in user interface 26 such as lights and special purpose buttons 32. Processor 22 controls the operation of transmitter 18 and receiver 16 over control lines 34 and 36, respectively, responsive to control messages and user input.

Microphone 38 receives speech signal input, converts the input into analog electrical signals and delivers the analog electrical signals to transmitter 18. Transmitter 18 converts the analog electrical signals into digital data, encodes the data with error detection and correction information and multiplexes this data with control messages from processor 22. Transmitter 18 modulates this combined data stream and broadcasts the resultant radio signals to the wireless network through duplexer. 14 and antenna 12.

According to the exemplary embodiment of this invention, receiver 16 includes a frequency converter 100 that changes the signal from the received frequency to an intermediate frequency and passes the intermediate frequency signal to a demodulator 102. The demodulator 102 demodulates the radio signal into a plurality of symbols according to one aspect of this invention, described below in connection with FIG. 3, using a reference frequency from frequency synthesizer 103. The decoded symbols are delivered to a code reassembler 104 that is advantageous in systems that use timeslots and interleave encoded data as a hedge against fading in the transmission. The Global System for Mobile communication (GSM) standard, for example, specifies such interleaving. Code reassembler 104 takes interleaved characters and reassembles them in their proper order. The output of code reassembler 104 is delivered to a decoder 106.

The decoder 106 decodes the received symbols and passes the corresponding information symbols to their destination, as is known in the art. Received groups of symbols (words) that are determined to be control messages are delivered to the processor 22. Received words that are voice traffic are delivered to synthesizer 108, which uses the words to synthesize speech or other sound. The synthesized speech is delivered to speaker 20. Of course, if mobile station 10 is being used as a data modem the information symbols are delivered directly from the decoder to a data output, not shown, but well known in the art.

Demodulator 102 receives radio signals as a plurality of waveforms, as is known in the art. The demodulator 102 converts the waveforms into symbols according to the modulation scheme of the wireless network with the help of automatic frequency correction unit 112. When demodulator 102 receives the symbols, the waveforms of the symbols have undergone fading due to the transmission medium. In addition, the timing of the signal is not known, and the frequency reference in the mobile station is offset from the carrier frequency of the received signal.

Figure 2:
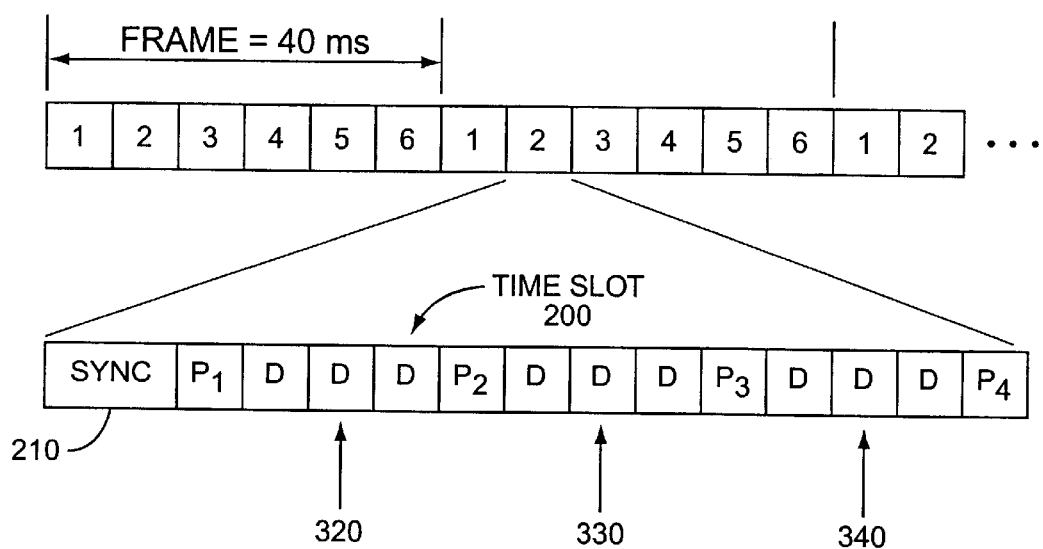
FIG. 2 is a diagram of a timeslot in a transmitted signal, illustrating the synchronized word and the relationship of pilot symbols and the data symbols.

Turning to FIG. 2, one timeslot 200 from one frequency as may be used in time division, multiple access (TDMA) is shown. Synchronization symbols 210 comprises a plurality of known characters which the demodulator uses to time align the timeslot, thus reducing the amount of error. Further, known pilot symbols, shown as $P_1$, $P_2$, $P_3$ and $P_4$, are used to determine frequency offset (channel estimates) by comparing the received symbol to the known pilot symbol and adding frequency offsets. The frequency offset is determined by attempting to fit a sinusoid to the channel estimates obtained from the pilot symbols and using knowledge of the statistical variations of the fading in time. However, this prior art technique, as described in the paper, "Frequency Offset Compensation of Pilot Symbol Assisted Modulation in Frequency Flat Fading" by Wen-Yi Kuo and Michael P. Fitz, which appears in the *IEEE Transactions on Communications*, Nov. 1997, pp. 1412–16, takes a relatively long time to converge.

Figure 3:
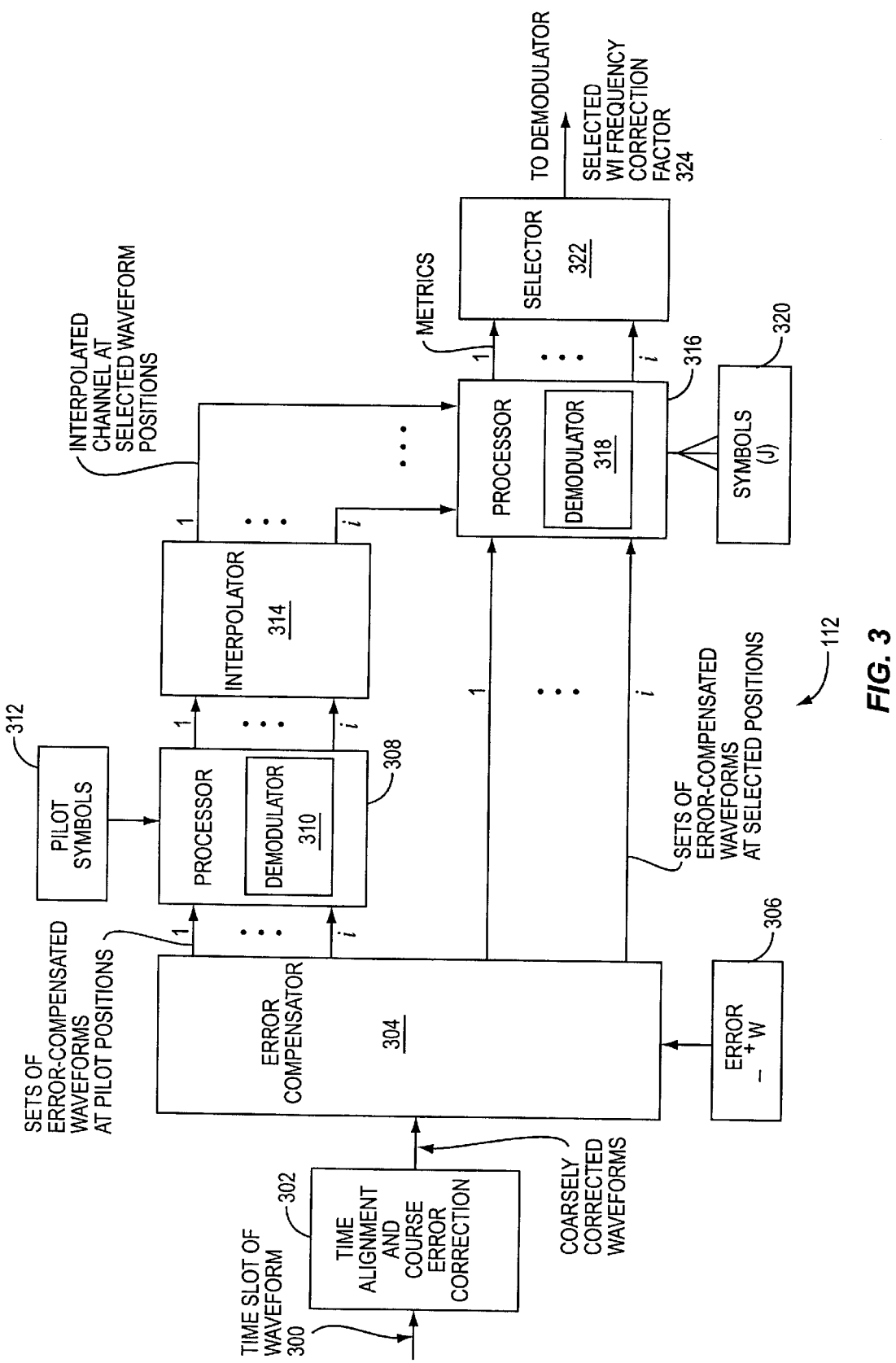
FIG. 3 is a block diagram of an automatic frequency correction device according to this invention.

Turning now to FIG. 3, a block diagram of an automatic frequency correction device 112 according to this invention is shown. A timeslot of waveforms representing symbols is received on line 300. Coarse frequency correction and timing estimation is performed by time alignment and coarse error correction unit 302, using the synchronization symbols to time align the timeslot and to derive a rough estimate of the frequency offset with a known error range of approximately $\pm Wh_2$.

Coarsely corrected waveforms are delivered to an error compensator 304, where postulates of the frequency error are selected. Postulates of the frequency error, $w_i$, are selected so that they are spaced (preferably evenly spaced) on a line from $-W$ to $W$ and stored in memory 306.

For each such postulate w, the waveforms at the pilot positions and waveforms at selected other positions are multiplied by a sinusoid of the postulates frequency error, $e^{-j2\pi w_j n}$, where:

j is the $\sqrt{-1}$ (square root of $-1$); and n is the waveform's location in the timeslot (in the example of FIG. 2, assuming that the sync word 210 is 16 symbols, $P_1$ is n=17, D at 320 is n=19, etc.).

The known error, $\pm W$, is stored in memory 306. All $w_i$ postulates are generally predetermined and stored in memory 306 as well.

In the error compensator 304, the waveforms at the pilot symbol locations and selected other locations are multiplied by $e^{-j2\pi w/n}$ to remove each postulated frequency error ($w_i$) from the coarsely corrected waveforms at each of the positions. In this exemplary embodiment, all processing is performed in parallel. Thus, there are i parallel processors, and i sets of waveforms being processed. However, it will be appreciated by a person skilled in the art that such processing can be performed in a serial fashion for the different postulates of the frequency offset as well.

A channel estimate is then calculated for each of the i sets of error-compensated pilot symbols (each set having a particular postulated frequency error w removed). A processor 308 uses a demodulator 310 to compare the error-compensated pilot symbols with the known pilot symbols that are stored in memory 312 and determine an appropriate channel estimates C. For example, if the symbol at $P_1$ is known to have been transmitted as D, and the communication unit actually receives R at $P_1$. The channel estimate, C, is determined to minimize the metric $|Rp_1-Cp_1*Dp_1|^2$.

The i sets of channel estimates are delivered to interpolator 314. Interpolator 314 use the channel estimates to determine appropriate channel estimate ("C") for each set of error-compensated preselected waveforms between the pilot symbols by suitable interpolation. In this exemplary embodiment, the error-compensated preselected waveforms comprise the waveforms of the symbols midway between pilot symbols (320, 330, 340, in FIG. 2) because they are in the most vulnerable position (most likely to be wrong because they are the symbols furthest away from the known pilot symbols, and hence interpolation of these symbols has the highest possibility of error). However, symbols at other locations (including more than one symbol between pilot symbols) could be used. An appropriate interpolator or Weiner filter is used, as is known in the art and explained in "Designs for Pilot Symbol-Assisted Burst Mode Communications with Fading and Frequency Uncertainty," by Wen-Yi Q. Kuo and Michael P. Fitz, *Int'l Journal of Wireless Information Networks*, Vol. 1, No. 4, 1994, pgs. 239–252.

Next, the interpolated channels at the preselected waveform positions are used to generate metrics in processor 316 by demodulating the symbols in demodulator 318 at the vulnerable (or other preselected) locations by minimizing the metric $|R_n-C_n*S_j|^2$, where:

$R_n$ are the error-compensated received symbols at position n;

$C_n$ is the interpolated channel estimate at position n; and $S_j$ is the possible value that symbols may have. (There are four possible discrete values for the symbols [i.e., four possible waveforms, j being 1–4] when modulation is QPSK [Quadrature Phase Shift Keying] and there are eight possible symbols [i.e., 8 possible waveforms, j being 1–8] when modulation is 8-PSK [eight Phase Shift Keying].);

A metric is accumulated for each postulate of the frequency error (w) (summing the metrics of the preselected symbols) to generate i accumulated metrics, each of which corresponds to a different postulate w.

The postulate of the frequency offset that corresponds to the minimum accumulated metric is selected at selector 322 as the best estimate of the frequency offset and that frequency offset 324 is then used as a frequency offset to demodulate the entire timeslot. In other words, the waveform over the entire received burst is corrected by a sinusoid corresponding the selected postulate of the frequency offset, the channel estimates at the pilot positions corresponding to this postulate of the frequency offset are interpolated to produce interpolated channel estimates over the entire range of symbols, and the symbols are demodulated. In the process of demodulating these symbols, the error signal, given by $R_n-C_n*S_j$, for the best possible discrete value $S_j$, is passed through a frequency loop, as described in U.S. Pat. No. 5,093,848, which is incorporated herein by reference, to obtain a smoothed estimate of the residual frequency offset that is not included in the postulate w. Alternatively, the phase of the error signal described above may be used. It is to be appreciated that an estimate of the frequency estimate thus generated may be used to correct the frequency reference used in the mobile station so that the frequency offset encountered during future reception of the signal may be reduced.

Figure 4:
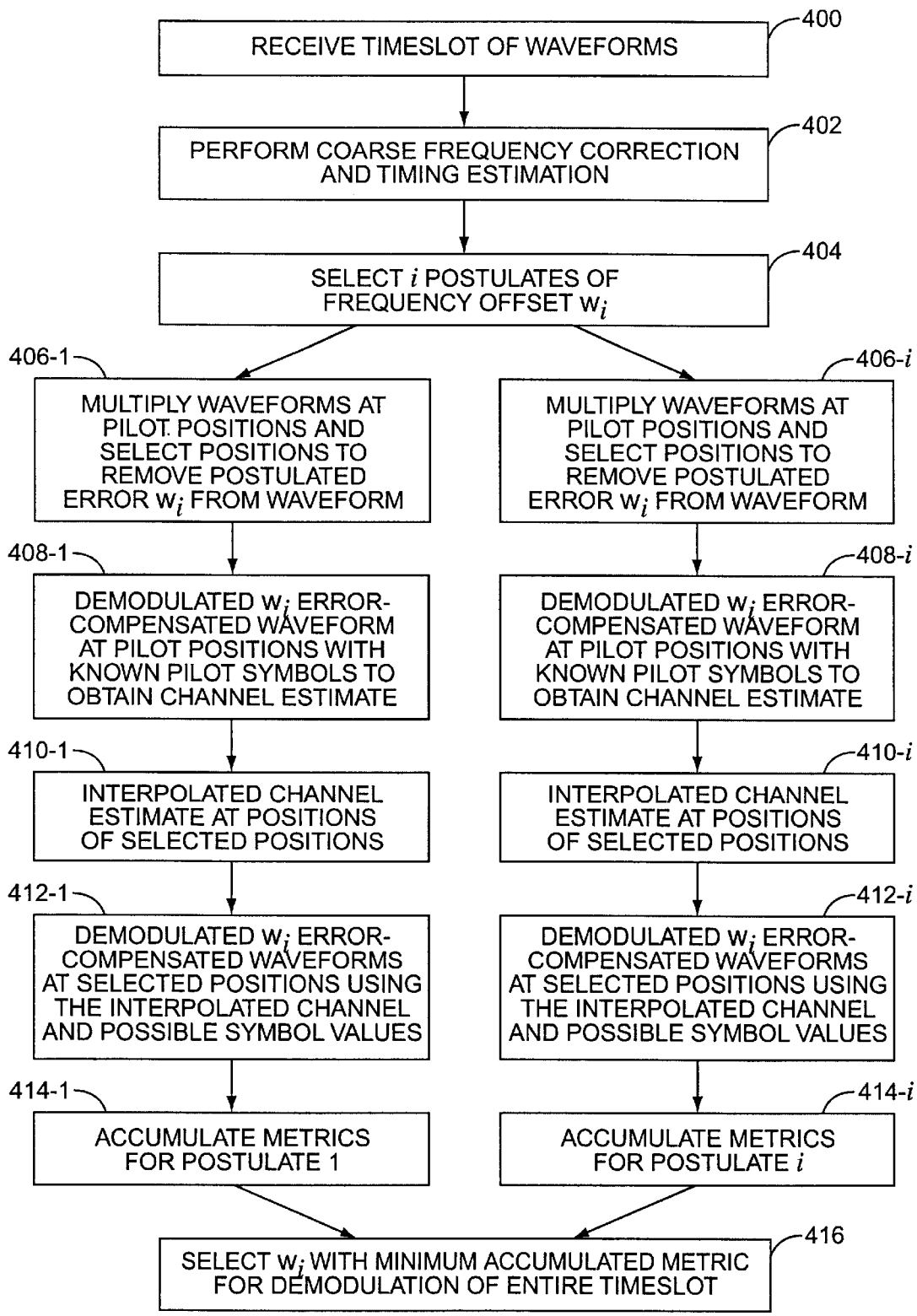
FIG. 4 is a flow chart of operations of the automatic frequency correction device of FIG. 3 according to an exemplary embodiment of this invention.

Turning now to FIG. 4, a flow chart of processing of the automatic frequency correction unit of FIG. 3 is shown. Processing begins in box 400 where a timeslot of waveforms is received. Processing continues to box 402 where a coarse frequency correction and timing estimation is performed on the timeslot of waveforms, preferably using a synchronization word. Such coarse frequency correction provides a first pass at obtaining the actual symbols.

A plurality (i) of postulates of the potential frequency offset (with a range of ±W) are then selected. These postulates may be selected so that they are even from +W to −W or may be weighted in one direction or the other depending upon the operating parameters of the system.

In box 406, processing splits into i different paths. There is one path for each postulated frequency offset i. In box 406-1, the waveforms at the pilot positions and preselected positions are multiplied as described above to remove the postulated error, $w_1$, from the waveform.

Processing proceeds to box 408 where pilot position waveforms are demodulated with the known pilot symbols to obtain a channel estimate, as is known in the art. In box 410, the channel estimate are interpolated at the preselected positions and, in box 412, the waveforms of the preselected positions are demodulated using the interpolated channel and possible symbol values. The demodulation is performed not to obtain the actual values of the symbols, but to obtain the metrics which reflect the probable accuracy of the error-compensated symbols.

In box 414, the metrics of the preselected symbols are accumulated for each postulate. The processing in boxes 406 to 414 is performed in parallel for each postulate from 1 to i. In box 416, the accumulated metrics are compared, and the postulate that resulted in the minimum metric is selected for use in demodulating the entire timeslot. After this step, error compensation is performed on the entire timeslot using the selected postulate.

It is to be understood that the above-described embodiment is to illustrate the principles of this invention, and that those skilled in the art may devise many variations without departing from the scope of the invention. It is, therefore, intended that such variations be included within the scope of the appended claims.

What is claimed is:

1. A method for selecting a frequency offset for automatic frequency correction in a pilot symbol assisted demodulator, said method comprising the steps of:

receiving a signal comprising a plurality of symbols having discrete possible values and a plurality of pilot symbols at predetermined locations in the signal, each pilot symbol having a predetermined value;

selecting a set of postulates defining possible frequency errors;

generating a set of error-compensated pilot symbols and a set of error-compensated selected ones of said plurality of symbols by compensating said pilot symbols and selected ones of the plurality of symbols according to each one of said set of postulates;

generating an estimated channel for each set of error-compensated pilot symbols;

generating an interpolated estimated channel for each set of estimated channels;

generating a metric for each of the set of error-compensated selected ones of the plurality of symbols using the symbols' discrete possible values and the interpolated estimated channels;

generating an accumulated metric by accumulating the metrics of each of the sets of error-compensated selected ones of the plurality of symbols; and selecting one of the set of postulates with the minimum accumulated metric for use as the frequency offset in automatic frequency correction.

2. The method of claim 1 wherein the step of generating a set of error-compensated pilot symbols and a set of error-compensated selected ones of the plurality of symbols comprises multiplying the pilot symbols and the selected ones of the plurality of symbols by a sinusoid of each one of the set of postulates.

3. The method of claim 1 further including the preliminary step of correcting time alignment of the signal.

4. The method of claim 2, wherein multiplying the pilot symbols and selected ones of the plurality of symbols by a sinusoid of the postulate comprises multiplying by $e^{-j2\pi n w_i n}$, wherein j comprises the square root of −1, $w_i$ is the frequency error associated with postulate i, and n comprises the symbol position.

5. The method of claim 1 wherein said received plurality of symbols comprises $R_n$, said interpolated estimated channel comprises $C_n$ and the discrete possible values comprise $S_j$, wherein the step of generating the metric comprises summing, from 1 to n, $|R_n - C_n * S_j|^2$, wherein $R_n$ comprises the received symbol at symbol position n, wherein $C_n$ comprises the interpolated channel estimate at symbol position n, and wherein $S_j$ comprises the set of possible values for the received symbol $R_n$.

6. The method of claim 1 wherein the selected ones of the plurality of symbols comprise symbols at one or more most vulnerable locations in the signal.

7. The method of claim 6 wherein the most vulnerable location is midway between two pilot symbols.

8. The method of claim 1 further including the step of performing coarse frequency correction of said signal before the step of selecting postulates.

9. The method of claim 5 wherein the signal is converted using a frequency reference prior to the step of selecting a set of postulates, said method further including the steps of:

generating an error signal from $R_n - C_n * S_j$;

passing the error signal through a frequency loop to obtain a smoothed estimate of the residual frequency offset; and correcting the frequency reference with the smoothed estimate of the residual frequency offset.

10. An automatic frequency correction device for use in pilot symbol assisted demodulator, said device receiving a plurality of waveforms representing a plurality of symbols, ones of said plurality of symbols being predefined pilot symbols, said automatic frequency correction device comprising:

an error compensator that generates a set of error-compensated pilot symbols and a set of error-compensated selected ones of the plurality of symbols according to a set of frequency offset postulates;

a channel estimator configured to estimate a channel for each set of error-compensated pilot symbols;

an interpolator configured to interpolate the set of estimated channels;

a demodulator that generates a plurality of metrics for each set of error-compensated symbols using the interpolated set of estimated channels; and a selector for selecting one of the set of postulates with the minimum of the plurality of metrics for use as the frequency offset in automatic frequency correction.

11. The automatic frequency correction device of claim 10 further including means for time aligning said pilot symbols and said plurality of symbols prior to error compensation.

12. The automatic frequency correction device of claim 10 further including means for coarse frequency correction of said pilot symbols and said plurality of symbols prior to error compensation.

13. The automatic frequency correction device of claim 10 wherein the error compensator multiplies the pilot symbols and selected ones of the plurality of symbols by each one of the set of frequency offset postulates.

14. A method of determining the frequency offset of a received signal that comprises a plurality of discrete symbols, including one or more pilot symbols at known symbol positions and one or more non-pilot symbols, said method comprising:

selecting a set of postulated frequency offsets;

for each postulated frequency offset:

correcting said pilot symbols and select non-pilot symbols for said postulated frequency offset;

generating channel estimates for said pilot symbols;

generating interpolated channel estimates for said selected non-pilot symbols using said channel estimates for said pilot symbols;

computing an error metric for said postulated frequency offset using said interpolated channel estimates; and selecting one of said postulated frequency offsets based on said error metrics.

15. The method of claim 14 wherein correcting said pilot symbols and said selected non-pilot symbols for said postulated frequency offset comprises multiplying said pilot symbols and said selected non-pilot symbols by a sinusoid.

16. The method of claim 15 wherein multiplying said pilot symbols and said selected non-pilot symbols by a sinusoid comprises multiplying by $e^{-j2\pi w_i n}$, wherein j comprises the $\sqrt{-1}$, $w_i$ is the frequency error associated with postulate i, and n comprises the symbol position.

17. The method of claim 14 further including correcting the time alignment of the received signal.

18. The method of claim 14 wherein computing an error metric for said postulated frequency offset comprises generating error signals, each corresponding to a selected non-pilot symbol in said received signal, using said interpolated channel estimates and combining said error signals.

19. The method of claim 18 wherein combining said error signals comprises computing the sum of the squares of said error signals.

20. The method of claim 14, said selected non-pilot symbols comprises one or more symbols located furthest from said pilot symbols.

21. The method of claim 14 wherein selecting one of said postulated frequency offsets using said error metrics comprises selecting the postulated frequency offsets that minimizes said error metric.

22. An automatic frequency correction device to determine the frequency offset of a received signal that comprises a plurality of discrete symbols including known pilot symbols and one or more non-pilot symbols, said device comprising:

an error compensator to correct said pilot symbols and select non-pilot symbols for each one of a plurality of postulated frequency offsets a channel estimator to estimate a channel for each set of corrected pilot symbols;

an interpolator to interpolate channel estimates for the selected non-pilot symbols using the channels estimates for the pilot symbols;

a demodulator that generates an error metric for each postulated frequency offset based on said interpolated channel estimates for the non-pilot symbols; and a selector to select one of the postulated frequency offsets based on the error metrics generated by the demodulator.

23. The device of claim 22 wherein the error compensator corrects said pilot symbols and selected non-pilot symbols for each one of the postulated frequency offsets by multiplying said pilot symbols and said selected non-pilot symbols by a sinusoid.

24. The device of claim 23 wherein multiplying said pilot symbols and said selected non-pilot symbols by said sinusoid comprises multiplying by $e^{-j2\pi w_i n}$, wherein j comprises the $\sqrt{-1}$, $w_i$ is the frequency error associated with postulate i, and n comprises the symbol position.

25. The device of claim 22 further including means for correcting the time alignment of the received signal.

26. The device of claim 22 wherein the demodulator computes error metrics for each of the postulated frequency offsets by generating error signals, each corresponding to a selected non-pilot symbol in said received signal, using said interpolated channel estimates and combining said error signals.

27. The device of claim 26 wherein the demodulator combines said error signals by computing the sum of the squares of said error signals.

28. The device of claim 22, the error compensator selects non-pilot symbols located furthest from said pilot symbols.

29. The device of claim 22 wherein the selector selects the postulated frequency offsets that minimizes said error metric.

* * * * *